(12) United States Patent
Gomez et al.

(10) Patent No.: US 8,369,778 B2
(45) Date of Patent: Feb. 5, 2013

(54) PORTABLE OBJECT INDUCTIVELY COUPLED TO A FIXED STATION AND COMPRISING GAIN CONTROL MEANS

(75) Inventors: Bertrand Gomez, Meylan (FR); Eric Colinet, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 518 days.

(21) Appl. No.: 12/591,493

(22) Filed: Nov. 20, 2009

(65) Prior Publication Data

US 2010/0144270 A1 Jun. 10, 2010

(30) Foreign Application Priority Data

Dec. 9, 2008 (FR) ...................... 08 06898

(51) Int. Cl.
*H04B 5/00* (2006.01)

(52) U.S. Cl. ...................... 455/41.1; 455/411

(58) Field of Classification Search ............. 455/41.1, 455/41.2, 41.3, 44, 411; 340/572.1, 10.1, 340/457, 457.4, 540, 10.34
See application file for complete search history.

(56) References Cited

U.S. PATENT DOCUMENTS

| 6,778,070 | B1 | 8/2004 | Thomas |
| 7,575,165 | B2 | 8/2009 | Villard et al. |
| 2006/0281405 | A1* | 12/2006 | Villard et al. ............... 455/41.1 |

FOREIGN PATENT DOCUMENTS

| EP | 1 914 669 A2 | 4/2008 |
| FR | 2 776 865 A1 | 10/1999 |
| FR | 2 859 842 A1 | 3/2005 |
| WO | WO 2005/029726 A1 | 3/2005 |

OTHER PUBLICATIONS

French Preliminary Search Report issued in French Patent Application No. 0806898 on Jul. 29, 2009 (w/ translation).

* cited by examiner

*Primary Examiner* — Ping Hsieh
(74) *Attorney, Agent, or Firm* — Oliff & Berridge, PLC

(57) ABSTRACT

The portable object is equipped with an antenna inductively coupled to a fixed station of a remote transmission device. The portable object comprises a variable load impedance and a rectifier connected in parallel to the terminals of the antenna, a regulation loop of the voltage at the terminals of the load impedance, connected between the output of the rectifier and a control terminal of the load impedance. The regulation loop comprises, in series, means for determining a difference between a setpoint voltage and the output voltage of the rectifier, a one-bit analog-to-digital converter, and command means of integrator type. The command means comprise a gain control input connected to an output of the gain control means receiving on input signals representative of the difference. Demodulation means are connected to the output of the converter.

6 Claims, 5 Drawing Sheets

PORTABLE OBJECT INDUCTIVELY COUPLED TO A FIXED STATION AND COMPRISING GAIN CONTROL MEANS

BACKGROUND OF THE INVENTION

The invention relates to a portable object equipped with an antenna inductively coupled to a fixed station of a remote transmission device, the portable object comprising a variable load impedance and a rectifier connected in parallel to the terminals of the antenna, a regulation loop of the voltage at the terminals of the load impedance, connected between the rectifier output and a control terminal of the load impedance, the regulation loop comprising, in series, means for determining a difference between a setpoint voltage and the output voltage of the rectifier, a one-bit analog-to-digital converter, and command means of integrator type, demodulation means being connected to the converter output.

STATE OF THE ART

In the telemetry field, inductive coupling between an antenna of a portable object and the antenna of a base station is commonly used. The base station emits a magnetic field which is received by the antenna of the portable object and processed. In most cases, the portable object is remote supplied and inductive coupling has in particular to enable power to be supplied to the portable object and the data emitted by the base station to be collected.

The electronic circuit embedded in the portable object therefore has to convert the energy of the magnetic field emitted by the base station antenna into a direct current necessary for power supply of the object while at the same time demodulating the received signal to perform data communication between the object and the base station.

As illustrated in FIG. 1, a portable object inductively coupled to a fixed station is known and described in numerous publications. The energy of magnetic field H emitted by antenna 4 of base station 2 is received by antenna 3 of the portable object and provides the power supply of the latter. A variable load impedance Z and rectifier 5 are connected in parallel to the terminals of antenna 3. Portable object 1 comprises a regulation loop 6 connected between rectifier 5 and a control terminal of variable load impedance Z. The document WO 2005/029726, filed by the applicant, describes a particular embodiment wherein the regulation loop comprises an analog-to-digital converter connected in series with command means. In this way, the regulation loop modifies the voltage at the terminals of antenna 3 of portable object 1 by modulating the value of variable load impedance Z. This regulation is conventionally performed with relation to a setpoint voltage.

Variable load impedance Z can be achieved by a transistor of MOSFET, JFET or bipolar type the control electrode whereof is connected to the output of the command means.

Although this architecture presents advantages, the stability of the regulation loop has to be improved to enable the portable object to be used, even in case of a large variation of load or field. Furthermore, the rapidity of the loop has to be improved to allow operation at a high communication rate.

OBJECT OF THE INVENTION

The object of the invention is to produce a portable object providing a trade-off between good setpoint voltage monitoring and rejection of disturbances acting on the regulation loop.

The portable object according to the invention is characterized by the appended claims and more particularly by the fact that the command means comprise a gain control input, connected to an output of the gain control means, receiving signals representative of said difference on input.

BRIEF DESCRIPTION OF THE DRAWINGS

Other advantages and features of the invention will become more clearly apparent from the following description of particular embodiments of the invention given for non-restrictive example purposes only and represented in the accompanying drawings in which.

DESCRIPTION OF PREFERRED EMBODIMENTS OF THE INVENTION

Figure 1:
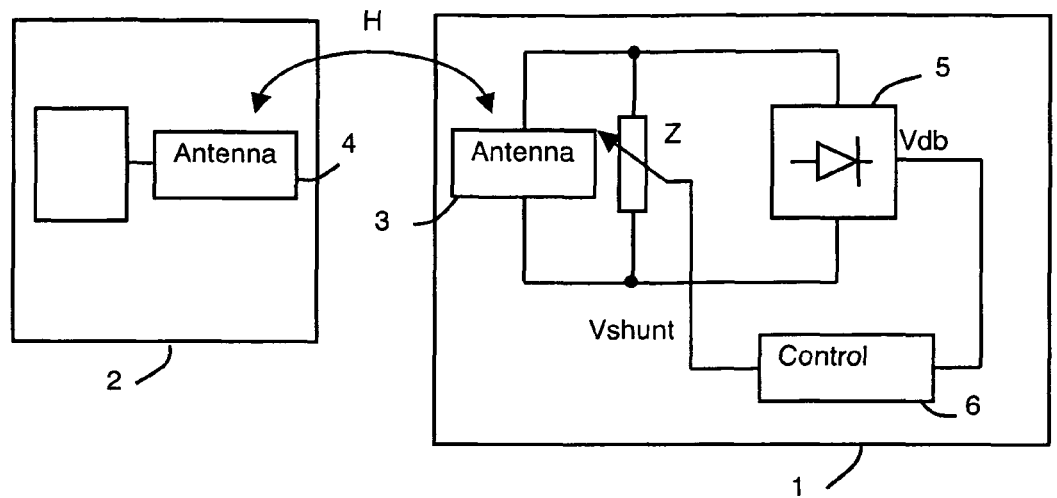
FIG. 1 represents an embodiment of a portable object according to the prior art in schematic manner.
Figure 2:
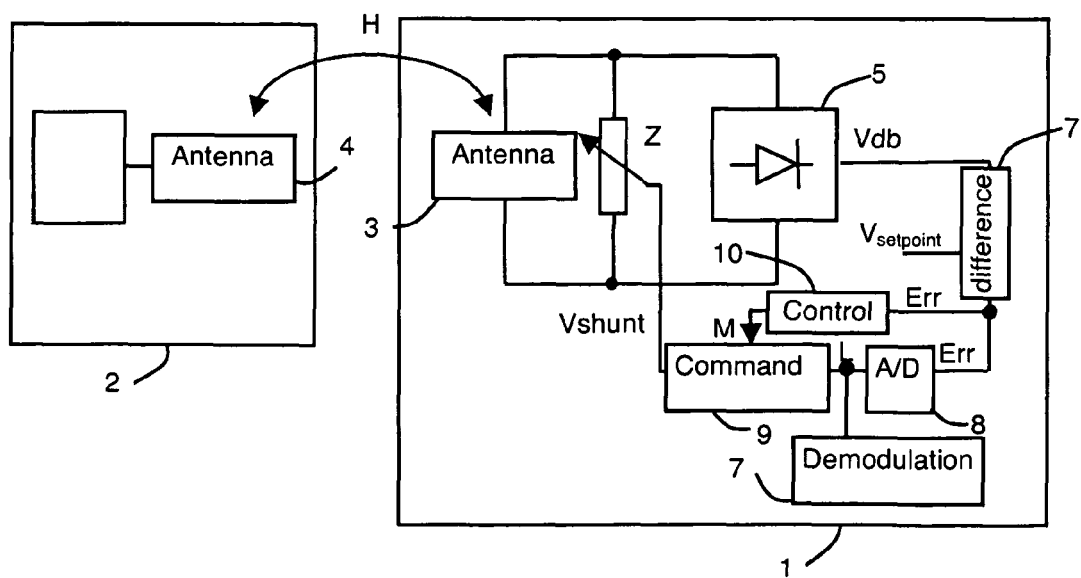
FIG. 2 represents a particular embodiment of a portable object according to the invention in schematic manner.

As illustrated in FIG. 2, portable object 1 and base station 2 are inductively coupled, via their respective antennas 3 and 4, for data transmission. In portable object 1, a variable load impedance Z and a rectifier 5 are connected in parallel to the terminals of antenna 3. The portable object also comprises a regulation loop 6 connected between rectifier 5 and a control terminal of variable load impedance Z. Regulation loop 6 comprises, in series, means 7 for determining a difference Err between a setpoint voltage $V_{setpoint}$ and the output voltage Vdb of rectifier 5, an analog-to-digital converter 8 and command means 9. Means 7 for determining a difference Err between a setpoint voltage $V_{setpoint}$ and the output voltage Vdb of rectifier 5 are therefore connected on output of rectifier 5, whereas command means 9 are connected to variable load impedance Z. Electrical connection between the output of converter 8 and the input of the command means is represented by electric node L.

In this way, regulation loop 6 modifies the voltage at the terminals of antenna 3 of the portable object by modulating the value of variable load impedance Z. This regulation is conventionally performed with respect to setpoint voltage $V_{setpoint}$.

Rectifier 5 can be achieved by any suitable circuit enabling an AC voltage to be transformed into a DC voltage. The rectifier can for example be a diode, a diode bridge, or half-wave or full-wave rectifying circuits.

Means 7 for determining a difference Err are formed for example by a comparator, the first and second input terminals whereof are respectively connected to setpoint voltage $V_{setpoint}$ and to output voltage Vdb of rectifier 5. The difference Err delivered by means 7 can be a positive or negative voltage depending on whether rectifier output voltage Vdb is higher or lower than setpoint voltage $V_{setpoint}$.

The voltage delivered by means 7 for determining, i.e. the difference Err, is then applied to an input of analog-to-digital converter 8 which then transforms this analog data into a digital signal which is representative of difference Err. On its output, converter 8 delivers a digital signal, on one bit, representative of difference Err between voltage Vdb and the setpoint voltage. The digital signal delivered by converter 8 is applied to an input of command means 9.

Analog-to-digital converter 8 can be a continuous-time converter, i.e. it continuously delivers a value representative of the difference between the voltages applied to its input terminals, or a sampled-time converter, i.e. it periodically delivers a value representative of the difference itself measured with the same period.

Regulation loop 6 also comprises an adjustable gain that is adjusted according to difference Err between the setpoint voltage and voltage Vdb on output of the rectifier. To do this, command means 9 comprise a gain control input M connected to an output of gain control means 10 receiving signals representative of said difference Err on input. Input M can be broken down into a plurality of sub-inputs also called M.

By means of modulation of the gain of regulation loop 6, the loop can present either too high a gain or a lower gain. In the case of a high gain, the residual oscillations on rectifier output voltage Vdb are rejected at higher frequency which enables good monitoring of setpoint voltage $V_{setpoint}$ and rejection of disturbances to be ensured. If on the contrary the gain is low, the amplitude of the oscillations on rectifier output voltage Vdb remains low.

Figure 3:
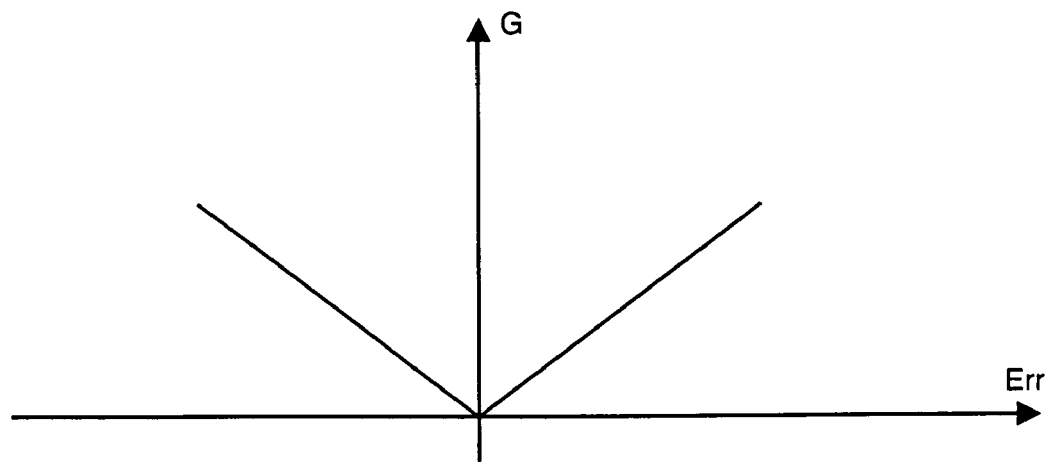
FIGS. 3 and 4 represent, in schematic manner, two control laws linking the gain (G) of the regulation loop to the difference (Err) between a setpoint voltage and a voltage to be regulated.
Figure 4:
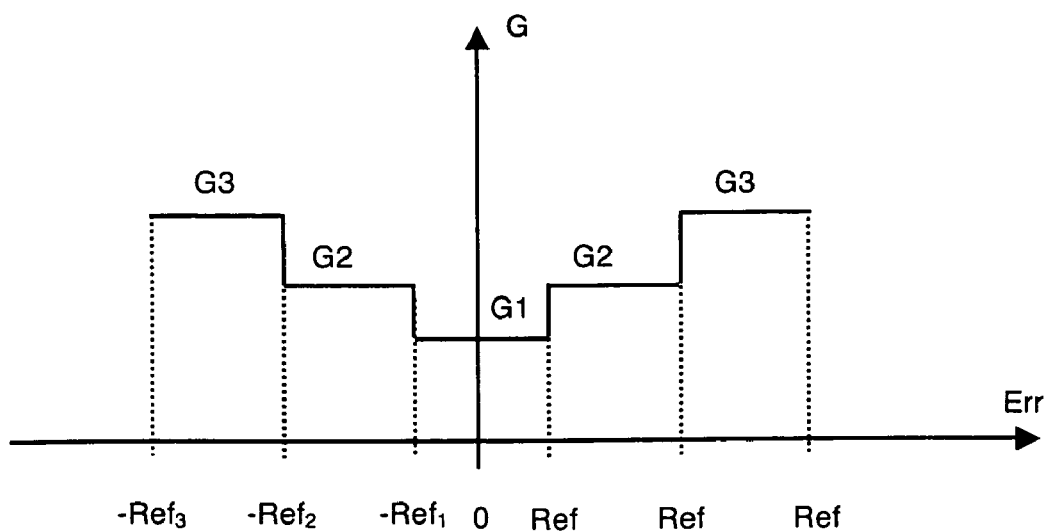

Gain control means 10 define a control law which can be linear or discrete in which gain G increases when the signal representative for example of difference Err on the input of converter 8 increases (FIG. 2). The control law of the gain control means can for example be of linear or exponential type or of any other suitable type generally increasing with the absolute value of difference Err. FIGS. 3 and 4 illustrate two control laws which represent the relation between gain G delivered by gain control means 10 and difference Err between the setpoint voltage and output voltage Vdb of the rectifier. In FIG. 3, a linear relation exists between the value of gain G and difference Err between setpoint voltage $V_{setpoint}$ and the voltage to be regulated, i.e. voltage Vdb. In a more precise manner, when the absolute value of difference Err increases, the value of gain G increases linearly. In FIG. 4, the relation between gain G and difference Err is discretized, in the present case it presents three plateaus G1, G2 and G3 associated with predefined ranges of differences Err. Thus, if difference Err is comprised between $-Ref_a$ and $Ref_a$, the value of gain G is equal to G1. If difference Err is comprised between $-Ref_b$ and $-Ref_a$ or between $Ref_a$ and $Ref_b$, the gain value is equal to G2, which is greater than G1.

In a first embodiment illustrated in FIG. 2, command means 9 comprise a gain control input M connected to gain control means 10 which receive, on input, difference Err between the setpoint voltage and output voltage Vdb of the rectifier. In a second embodiment illustrated in FIG. 5, command means 9 comprise a gain control input M connected to an output of gain control means 10 receiving on input the digital signal delivered by analog-to-digital converter 8, which is a signal representative of difference Err.

Figure 6:
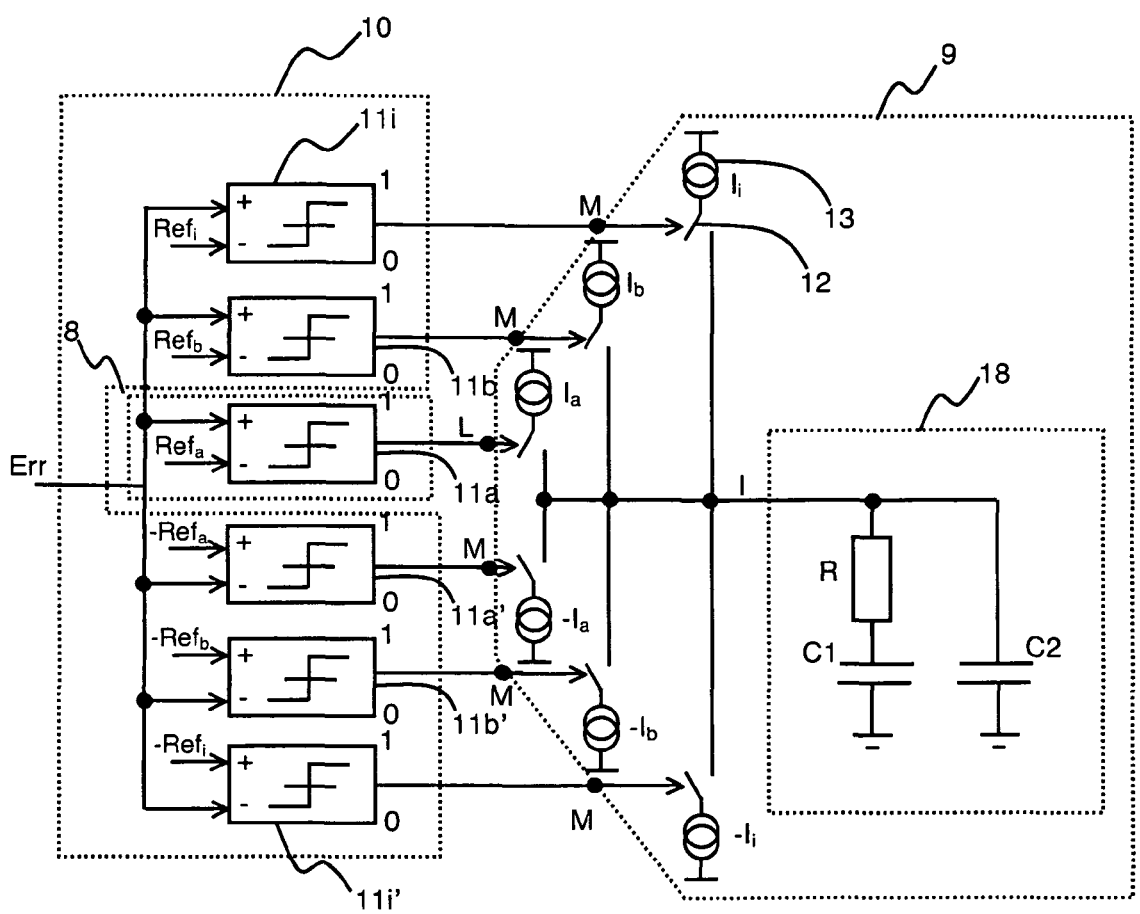
FIG. 6 represents a particular embodiment corresponding to FIG. 2 in more detailed manner.

In a particular embodiment corresponding to the first embodiment and illustrated in FIG. 6, difference Err between setpoint voltage $V_{setpoint}$ and voltage Vdb is applied to the input of a plurality of comparators 11.

Each comparator 11 comprises first and second input terminals and an output terminal. The output terminal of each comparator 11 is connected to a control terminal of an electronic switch 12, one of the two input/output terminals whereof is connected to a current generator 13, the remaining input/output terminal whereof being connected to an integrator circuit 18 which is integrated in command means 9. Comparators 11 are each associated with a specific reference voltage Ref. Comparators 11 thus perform comparison between reference voltage Ref and difference Err and deliver a digital data bit (0 or 1) accordingly. Comparators 11 associated with reference voltages Ref define the control law to be applied in gain control means 10.

FIG. 6 can thus be broken down in the following manner: integrator circuit 18, current sources 13 and electronic switches 12 that are associated therewith belong to command means 9. Comparators 11 associated with their reference voltages Ref belong to control means 10. In this way, electronic switches 12 receive data coming from a signal representative of the difference between output voltage Vdb of rectifier 5 and setpoint voltage $V_{setpoint}$ on their control inputs, i.e. on gain control inputs M of command means 9. However, comparator 11a of the plurality of comparators that is associated with a zero reference voltage, here voltage $Ref_a$, does not belong to control means 10 but belongs to analog-to-digital converter 8. Signal demodulation means 17 are then connected, on node L, between the output of comparator 11a and electronic switch 12 associated therewith.

The particular embodiment illustrated in FIG. 6 corresponds to a discrete control law as illustrated in FIG. 4. In this very particular embodiment, comparators 11 are then split into two families (11 and 11') which comprise exactly the same number of comparators. In the first family of comparators 11, difference Err between the setpoint voltage and output voltage Vdb of the rectifier is applied to a first input terminal of each comparator, for example the positive terminal. In the second family of comparators 11', difference Err between the setpoint voltage and output voltage Vdb of the rectifier is applied to the second input terminal of each comparator 11, for example the negative terminal. In both families, the input terminal remaining free of each comparator is then connected to a specific reference voltage $Ref_i$. At least one reference voltage, here $Ref_a$, is zero and serves the purpose of defining converter 8.

Advantageously, the control law being symmetrical with respect to the y-axis (FIG. 4), the reference voltages used are identical in absolute value but of opposite sign (Ref and −Ref) for each of the families. It is also possible to use different references voltages between the two families to work with a non-symmetrical control law. To implement the control law illustrated in FIG. 4, voltage $Ref_b$ corresponds to voltage $Ref_1$ and voltage $Ref_c$ (not shown) corresponds to voltage $Ref_2$.

For example purposes, comparators 11b and 11b' belong to two different families. Difference Err between the setpoint voltage and voltage Vdb is applied to the first input terminal of comparator 11b whereas the same difference Err is applied to the second input terminal of comparator 11b'. The reference voltages associated with comparators 11b and 11b' are identical in absolute value but of opposite sign, $Ref_b$ and $-Ref_b$.

Furthermore, a specific current source I is associated with each reference voltage Ref. Comparator 11b is thus associated with reference voltage $Ref_b$ and with current source 13 $I_b$ via an electronic switch 12. Comparator 11b' is for its part associated with reference voltage $-Ref_b$ and with current source $-I_b$ via an electronic switch. In the same way, comparator 11i is connected to reference voltage Ref; and acts on electronic switch connected to current source $I_i$.

Therefore, if difference Err is comprised between $Ref_a$ and $Ref_b$, comparator 11a delivers a signal on output which actuates closing of electronic switch 12a. This results in a current $I_a$ being applied to the input of integrator circuit 18, current $I_a$ being proportional to gain G1. If difference Err is greater at least than $Ref_b$, at least comparators 11a and 11b each deliver a signal on output which actuates closing of electronic switches 12a and 12b. This then results in a current at least equal to $I_a+I_b$ being applied to the input of circuit 18, current $I_a+I_b$ being proportional to gain G2.

In another particular embodiment that is not represented, comparator 11b is not used and the switch and current source that were associated therewith are connected to the output signal of comparator 11a, which has previously been transformed into its opposite. In this embodiment, comparator 11a still belongs to converter 8, but its inverted output forms part of control means 10.

Figure 5:
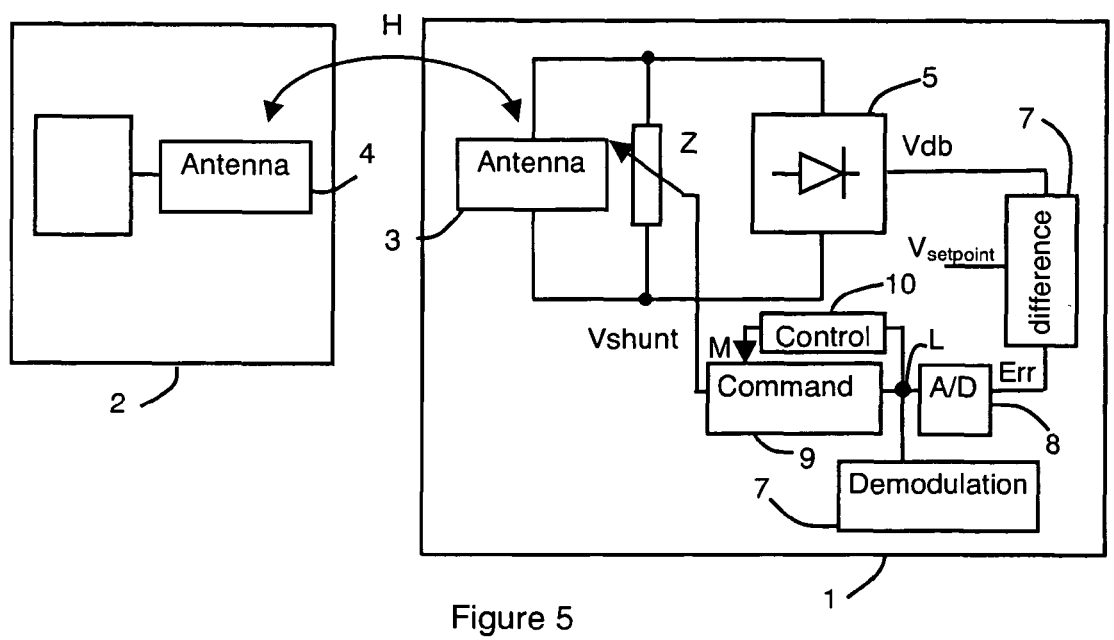
FIG. 5 represents a second particular embodiment of a portable object according to the invention in schematic manner.
Figure 7:
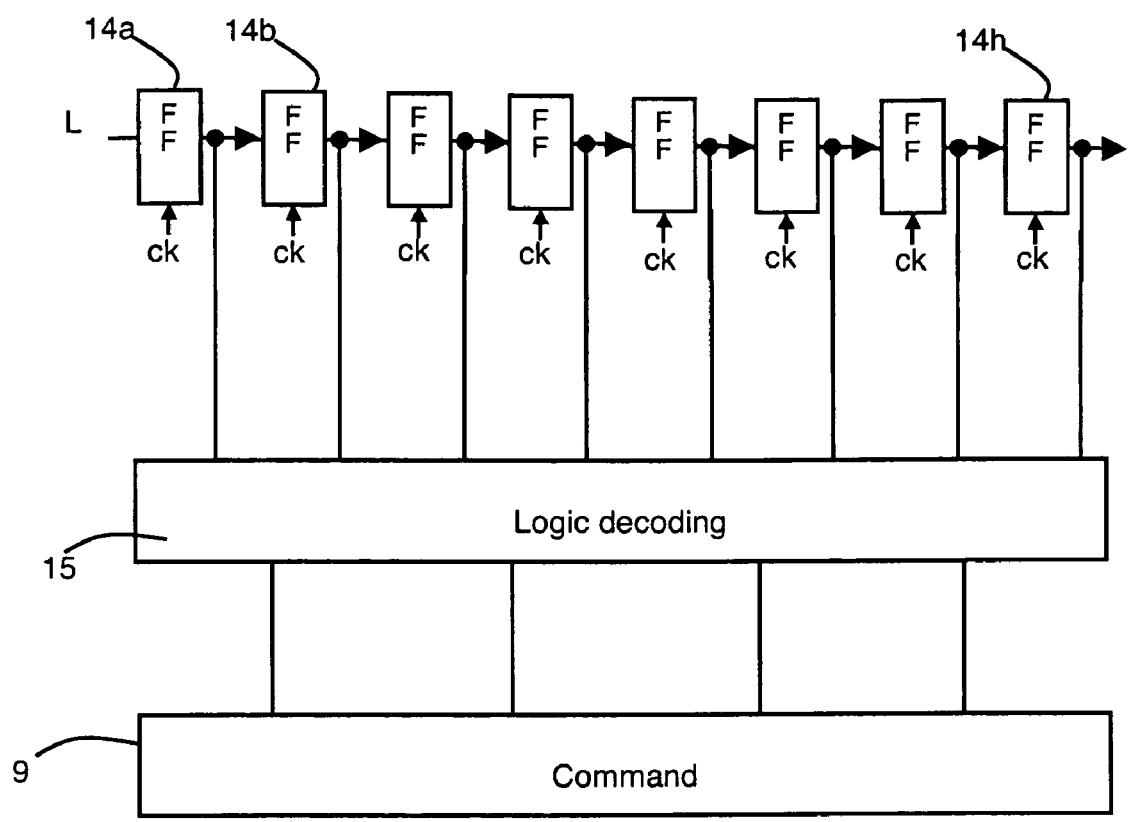
FIG. 7 represents a particular embodiment corresponding to FIG. 3 in more detailed manner.

In another particular embodiment illustrated in FIG. 7 and corresponding to the second embodiment illustrated in FIG. 5, the gain value is a function of the period during which the value of the digital signal representative of difference Err is constant, i.e. always equal to 1 or always equal to 0. In this particular embodiment, gain control means 10 comprise means for time integration of the signal applied to their input.

In this particular embodiment, gain control means 10 comprise a plurality of flip-flops (FF) 14 connected in series. Each flip-flop 14 comprises a signal input terminal, a signal output terminal and an input terminal of a clock signal ck. The input terminal of a flip-flop 14 is connected to the output terminal of the previous flip-flop and the output terminal of the flip-flop is connected to the input terminal of the next flip-flop. All the clock signal input terminals are furthermore connected to the same clock signal ck. The different flip-flops 14 are therefore synchronized. In this way, the bits delivered by analog-to-digital converter 8 transit via the different flip-flops as the clock signals are delivered. In FIG. 7, the bits delivered by converter 8 pass, from electric node L, through eight flip-flops from flip-flop 14a to flip-flop 14h. Each of the flip-flops then represents the value of the digital signal representative of the difference at a given time.

The signal output terminals of each flip-flop 14 are also connected to a logic decoding circuit 15. This logic decoding circuit enables the time variations of the digital signal representative of the difference to be controlled. Thus, if the signal represents a perfect alternation of 0 and 1, i.e. of high states and low states, the decoding circuit delivers a minimum gain. The greater the deviations of this alternation on the other hand, the decoding circuit delivers a high gain, according to the control law integrated in decoding circuit 15 by control means 10. It is also possible and advantageous to take account of the position of the deviation from alternation in computing the gain value. Thus, if the deviation from a perfect alternation is present at flip-flop 14h, the gain will be lower than if the same deviation was present on flip-flop 14a.

Portable object 1 also comprises demodulation means 17 which are connected between analog-to-digital converter 8 and command means 9. The demodulation means use the digital signal emitted by converter 8 to process the data contained in magnetic field H emitted from the fixed station to the portable object. Demodulation means 17 are connected to electric node L.

In another embodiment which can advantageously be combined with the previous embodiments, the regulation loop is partially or totally deactivated in the load impedance variation phase. This deactivation enables a conflict with impedance modulation to be avoided. Patent application WO 2005/029726 describes for example a particular architecture. It is then possible to force a periodic signal on the input of a bang-bang controller while at the same time disconnecting the output of the variable load impedance loop filter.

In a particular embodiment that can be implemented with what has been described in the foregoing, the circuit can send data back from the object to the fixed station. To send this data, the portable object modifies the impedance it presents at the terminals of its antenna. The impedance transferred to the fixed station side is consequently modified. The data is then encoded by load variations of the portable object.

In its conventional operation, the regulation loop rejects all disturbances occurring at the terminals of the circuit. The regulation loop thereby enters into conflict with the load variation inherent in the principle of communication by load modulation. It is therefore necessary to limit, or at least modify, the effect of the regulation loop during a communication of the portable object to the fixed station.

This limiting can be performed for example by freezing the state of the regulation loop during the communication phases. This frozen state can be achieved by forcing the periodic signal on the input of the bang-bang controller. For example, signal cut-off means, for example an electronic switch, are fitted between means 7 for determining the difference 7 and analog-to-digital converter 8. Once converter 8 has been disconnected from means 7 for determining, a periodic error is applied to the input of converter 8 by periodic signal application means (not shown). During this phase, a constant voltage $V_{shunt}$ is applied to variable load impedance Z.

The invention claimed is:

1. A portable object comprising:
    an antenna inductively coupled to a fixed station of a remote transmission device,
    a variable load impedance connected in parallel to terminals of the antenna,
    a rectifier with an input connected to one of the terminals of the antenna,
    a gain control loop connected between an output of the rectifier and a control terminal of the variable load impedance and configured to control the voltage at terminals of the variable load impedance, the gain control loop comprising, connected in series:
        a circuitry configured to generate a first signal representative of a difference between a setpoint voltage and an output voltage of the rectifier,
        a one-bit analog-to-digital converter arranged to convert said first signal into a digital signal,
        a gain control circuitry configured to provide a variable gain according to a second signal representative of the first signal,
        a gain command circuitry of integrator type having a first input coupled to an output of the converter, a second input coupled to an output of the gain control circuitry and an output coupled to the control terminal of the variable load impedance, and
    demodulation means connected so as to receive the digital signal from the output of the converter.

2. The object according to claim 1, wherein said second signal is the first signal.

3. The object according to claim 1, wherein said second signal is the digital signal.

4. The object according to claim 3, wherein the gain control circuitry comprises a circuitry configured for time integration of the second signal.

5. The object according to claim 1, comprising:
    a circuitry configured to cut-off the first signal and disposed between the converter and the circuitry configured to generate a first signal, and
    a circuitry configured for applying a periodic signal to an input of the converter.

6. The object according to claim 1, wherein the rectifier is connected in parallel to the terminals of the antenna.

* * * * *